T. V. MUNSON.
Scuffle-Hoe.
No. 213,584. Patented Mar. 25, 1879.
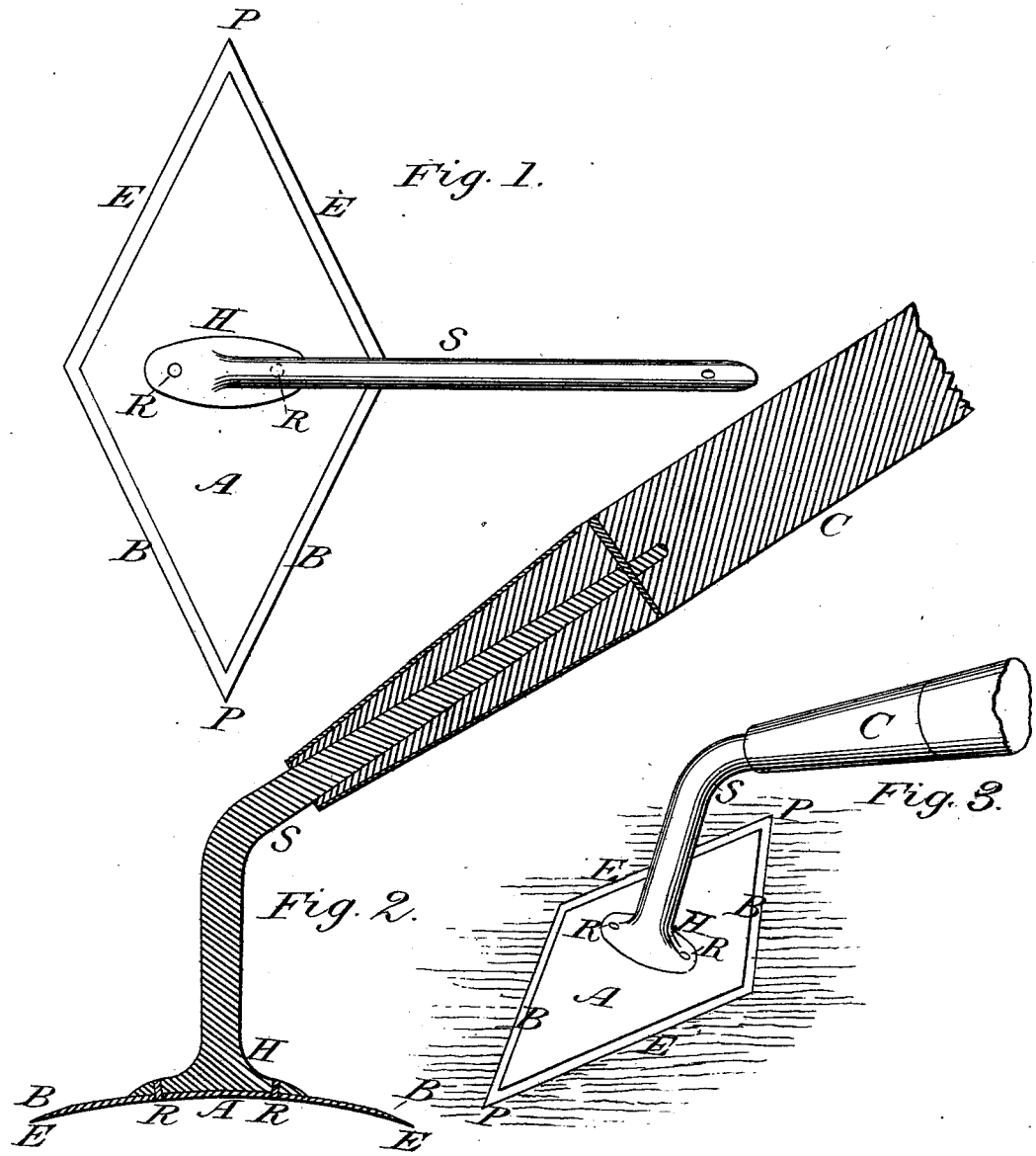
Attest:
Edward Perry
J. H. Coffin
Inventor:
T. V. Munson

UNITED STATES PATENT OFFICE.

THOMAS V. MUNSON, OF DENISON CITY, TEXAS.

IMPROVEMENT IN SCUFFLE-HOES.

Specification forming part of Letters Patent No. 213,584, dated March 25, 1879; application filed October 16, 1878.

*To all whom it may concern:*

Be it known that I, THOMAS VOLNEY MUNSON, of Denison City, in the county of Grayson and State of Texas, have invented a new and useful Improvement in Garden Implements for the Destruction of Weeds and Stirring the Soil by Hand, of which the following is a specification:

The invention relates to scuffle-hoes, for the rapid and effective killing of weeds and weeding, subsoiling, and stirring the earth among garden-crops.

Heretofore such hoes have been made to cut in only one direction—directly upon the surface of the ground—and for the one purpose only of destroying small weeds, working heavily and with comparatively slow speed, using a straight blade, with a direct or bruising cut, hung by two shanks, or two blades, with a draw-cut, crossing each other like the blades of shears, hung with one shank at the crossing, the former easily clogging between the shanks, and the latter between the blades, both being more complex and expensive and less durable, and neither capable of being used as pulverizers or subsoilers.

The object of my invention is to provide a simpler, stronger, yet lighter, more effective, and rapid scuffle-hoe, and in the same implement a good pulverizer for several inches below the surface, which will be less expensive to make, more durable, and more easily worked than such implements now in general use.

The invention consists in a thin diamond-shaped plate of steel or other metal, attached at or near the center of its upper convex surface to a shank, so as to be in a horizontal position when in use, thus securing a draw-cut.

It also consists in having the plate made concave on the under surface and convex on the upper surface, thereby lifting and breaking the soil when drawn below the surface as a subsoiler.

It also consists in having an edge entirely around the margin of the plate or blade, made by beveling the upper surface. This form of edge with the concave under surface throws the wear chiefly upon the under side of the edge, causing use to partially sharpen the implement, and also causes the blade to readily enter the soil to any desired depth by downward pressure upon the handle when making a stroke. Having edge all around the blade allows it to cut in any horizontal direction in which it may be moved, especially forward or backward, thus utilizing every motion.

In the accompanying drawings, in which similar letters of reference indicate like parts, Figure 1 is a perpendicular view upon the blade A of the hoe, showing the attachment of the shank S by rivets R R, or otherwise, to the center of the plate A through the head H of shank. B B is the bevel to form the edge E E.

Fig. 2 is a vertical section through the shank S, head H, and blade A, showing the concavo-convex shape of blade and the downward slant of bevel B B; also the manner in which the wear comes chiefly on the under side of edge E E against the horizontal surface of earth, (indicated by the dotted line.) C is a portion of the handle, which, when prolonged, allows the operator to stand almost erect.

Fig. 3 is a perspective view of the implement in position for use, the parallel lines to right and left indicating the surface of the ground.

The operation of the device is readily seen to be a backward and forward movement at the end of each stroke, moving to right or left, so as to cut afresh at each movement.

To cut deeply, as for breaking up the soil, or shallow, as for killing weeds, press down more or less on the handle in drawing or pushing. With the more slender points P P of the blade, weeds can be cut and soil loosened between plants growing closely together without the necessity of bending the back.

What I claim is—

In a scuffle-hoe, the diamond-shaped blade A, concave on the lower side and convex on the upper side, and hung on a shank, S, transversely to greatest diameter of blade, the cutting-edge E all around the margin of the blade, and the bevel B on the upper convex surface, substantially as shown and described.

THOMAS VOLNEY MUNSON.

Witnesses:
EDWARD PERRY,
A. H. COFFIN.